United States Patent

Cohen et al.

[19]

[11] Patent Number: 6,098,654
[45] Date of Patent: Aug. 8, 2000

[54] FLOW BLOCKAGE SUCTION INTERRUPT VALVE

[75] Inventors: Joseph D. Cohen, Aurora, Colo.; Richard E. Meyer, Loyal, Okla.

[73] Assignee: Fail-Safe, LLC, Aurora, Colo.

[21] Appl. No.: 09/235,232

[22] Filed: Jan. 22, 1999

Related U.S. Application Data

[60] Provisional application No. 60/072,227, Jan. 23, 1998.

[51] Int. Cl.[7] .................................................. F16K 17/04
[52] U.S. Cl. .......................... 137/467; 137/556; 137/907
[58] Field of Search ................................. 137/456, 467, 137/907, 556

[56] References Cited

U.S. PATENT DOCUMENTS

| | | | |
|---|---|---|---|
| 3,780,759 | 12/1973 | Yahle | 137/467 |
| 4,949,748 | 8/1990 | Chatrathi et al. | 137/115.26 |
| 5,351,709 | 10/1994 | Vos | 137/114 |
| 5,351,714 | 10/1994 | Barnowski | 137/467 |
| 5,682,624 | 11/1997 | Ciochetti | 4/509 |

*Primary Examiner*—Stephen M. Hepperle
*Attorney, Agent, or Firm*—Carol W. Burton, Esq.; Hogan & Hartson LLP

[57] ABSTRACT

A flow blockage suction interrupt of the present invention reduces the dangerous possibility of bodily suction entrapment of a bather in a swimming, wading, or hydrotherapy pool. The safety valve operates to instantaneously introduce atmosphere into a suction piping system of a pool when a dangerous vacuum condition is detected. The incoming atmosphere breaks the vacuum, freeing entrapped bather. The safety valve includes a dynamic plug and dual spring-loaded actuators, one closing and one opening the valve to atmosphere. The closing actuator is dominant until the opening actuator is triggered by the dangerously high vacuum level that accompanies bodily suction entrapment. The preferred embodiment incorporates a spring-loaded telescopic actuator shaft that is spring-loaded to open fully once triggered, and is triggered by a factory-calibrated diaphragm-actuated suction sensor. Once this safety valve has been tripped, it must be manually reset by the pool operator.

19 Claims, 9 Drawing Sheets

FLOW BLOCKAGE SUCTION INTERRUPT VALVE

RELATED APPLICATION

The present application claims priority from U.S. Provisional patent application Ser. No. 60/072,227 entitled POOL SAFETY VALVE, filed Jan. 23, 1998.

FIELD OF THE INVENTION

The present invention relates to flow control valves adapted for use in swimming, hydrotherapy and wading pool water circulation lines. More specifically, the present invention relates to flow blockage suction interrupt valves in pool circulation lines intended to reduce injury to bathers resulting from operation of water circulation systems when lines are partially or fully blocked.

BACKGROUND OF THE INVENTION

Swimming pools typically include outlet fittings located beneath the surface of the water on the pool interior. These fittings supply the outgoing flow of water to the pool circulation system. Under certain circumstances, such fittings can entrap a bather with their suction, resulting in serious and sometimes fatal physical injury or death by drowning.

Swimming pools subject to these suction entrapment hazards have outlet fittings which are in direct fluid communication with centrifugal circulation pumps. These pumps are capable of creating dangerously high vacuum levels when water supply is restricted or blocked. This can occur when a bather blocks the flow of water through the outlet fitting. The flow blockage which results causes the centrifugal circulation pump to create a high vacuum level within the piping attached to the outlet fitting entrapping the bather.

To prevent these hazards in new swimming pools, new building codes and regulations are being enacted which require multiple outlet fittings for each swimming pool centrifugal circulation pump. However, multiple outlet fittings can not prevent injuries if alternate fittings are blocked by debris or by another bather, or a low water level shut-off valve is closed. In any case, adding additional outlet fittings to existing swimming pools is often impractical or impossible.

In an alternative attempt to prevent suction related injuries, covers for outlet fittings have been designed and commercialized in which, the geometrical orientation of their orifices, the flow therethrough from being totally blocked by a human body. Unfortunately, these protective covers must be removable to facilitate construction and maintenance of the pool. Consequentially such covers are frequently broken or missing in an operational swimming pool. Thus the protection afforded against bodily suction entrapment can be somewhat illusory.

Certain valves shut off the flow at the outlet fitting if the safety cover is missing. However, such valve are specifically designed for a particular outlet fitting model. Not all outlet fittings accept such valves.

In addition to suction entrapment safety devices installed at the outlet fittings, described above, protective safety devices have been designed that can be also installed on the circulation system to minimize the risk of suction entrapment injury. One such device is an electrical switch that shuts off the circulation pump in the event the vacuum level within the piping reaches a dangerous level. However, if the circulation system incorporates a check valve (e.g., a one way valve), stopping the circulation pump does not always neutralize the vacuum level and free the entrapped bather.

Additionally, safety relief valves have been designed to react to the dangerously high level of vacuum within the circulation system piping that accompanies the suction entrapment of a bather, and by their actuation, neutralize this vacuum with the introduction of atmosphere. These safety relief valves are attached to and in fluid communication with the piping near the pump. These devices offer a convenient and easily installed solution to these hazards on existing swimming pools.

Such safety relief valves incorporate a similar irresolute process of opening. They open by atmospheric pressure overcoming the pressure provided by a spring against a movable plug when the vacuum within the piping increases. Normally the spring holds the plug in the closed position. When the vacuum increases above the safe level the atmospheric pressure overcomes the spring and pushes the plug so as to open the valve to atmosphere. The problem with this method is that when the vacuum level approaches the predetermined desired actuation point the valve position can vacillate between closed and open. Such valves may even repeatedly open partially and reclose, not achieving full actuation unless the desired actuation point has been exceeded by a substantial margin. Basically they start to open too early and achieve full actuation too late. Thus, the possibility of suction entrapment injury remains.

It is against this background that the significant improvements and advancements of the present invention have taken place.

OBJECTS OF THE INVENTION

Accordingly it is an object of the present invention to provide a safety device for swimming pools, wading pools and hydrotherapy pools, that minimized the possibility of bodily suction entrapment of bathers blocking the effluent flow of water at a pool outlet fitting.

It is also an object of the present invention to provide an add-on safety device that can be installed on new pools under construction, also be easily retrofitted to existing pools presenting suction entrapment hazards.

Another object of the present invention is to provide a safety device to reduce the risk of bodily suction entrapment injury by instantly and reliably opening the suction piping to atmosphere in the event a dangerously high suction occurs.

It is also an object of the present invention to provide a safety relief device that once tripped encourages good pool operation maintenance practices.

It is also an object of this invention to provide a safety device that is non serviceable tamperproof and cannot be disabled from performing its safety function while properly installed.

Additionally it is an object of the present invention to the flowstream of the swimming pool circulation system, corrosive pool chemical fumes, insects and other pests, and the elements of nature.

It is a further object of the present invention to remain dormant and not adversely affect the operation of the swimming pool circulation system unless and only when a specific predetermined trigger point in the vacuum level is reached within the piping.

It is another object of the present invention to that allows a pool operator to manually verify that the safety valve is operational.

It is also an object of the present invention to provide the pool operator with a visual status indicator of the safety valve status, clearly showing whether the safety valve is either armed or tripped.

SUMMARY OF THE INVENTION

The flow blockage suction interrupt valve of the present invention provides a safety device for swimming pools, wading pools and hydrotherapy pools that reduces the possibility of bodily suction entrapment of bathers blocking the effluent flow of water at a pool outlet fittings. The preferred embodiment of the valve instantly opens the suction piping to atmosphere in the event a dangerously high suction occurs. It not only nullifies the suction force acting on the entrapped bather, but also creates a back flow which further assists freeing the entrapped bather.

The flow blockage suction interrupt valve of the present invention includes a housing defining a flow path between atmosphere and a pool piping system. Positioned in the housing is a dynamic plug which is adapted for opening and closing the flow path. The valve further includes a spring-loaded first actuator means attached to the dynamic plug. The first actuator means is operative to place the valve in an armed (closed) state or a tripped (open) state. More particularly, in the armed state, the dynamic plug closes the flow path, preventing atmospheric air from reaching the suction piping system through the valve and allowing normal pool system operation. The valve also includes spring-loaded second actuator means normally not acting on the plug, which is adapted to reposition the plug and open the flow path to relieve excessive suction in said piping system. The valve also includes a triggering means activated by a predetermined vacuum level. The triggering means is operatively connected to the second actuator means. When said predetermined vacuum level activates the triggering means, the second actuator means acts on the plug, predominating the first actuator means, opening the flow path, allowing atmosphere to enter the piping system, and placing the valve in a tripped state.

During normal operation, the flow blockage suction interrupt valve of the present invention remains dormant and is designed to not adversely affect the operation of the swimming pool circulation system unless a specific predetermined trigger point in the vacuum level created by the bodily suction entrapment of a bather is reached within the piping. In the event this factory-calibrated trigger set point in vacuum level occurs, the present invention is then triggered into a non-reversible full actuation of its dynamic plug, hydraulically opening the piping to atmosphere. Once tripped, the preferred embodiment of the present invention requires a manual—not automatic—reset, so as to require a manual priming and restart of the swimming pool circulation system which will in turn encourage a general inspection of the pool by the operator.

The preferred embodiment of the present invention is non serviceable, tamperproof, and cannot be disabled from performing its safety function while properly installed. The internal parts of the present invention are physically isolated from contact the flow stream of the swimming pool circulation system, corrosive pool chemical fumes, insects and other pests, and the elements of nature, and thus deterioration of the internal parts is prevented. Reliability of operation of the flow blockage suction interrupt valve of the present invention is further maximized because the is operated by the hydraulic energy of the swimming pool circulation system, without a need for any electrical components.

The preferred embodiment of the flow blockage suction interrupt valve of the present invention includes a test button that allows the pool operator to manually verify that the safety valve is operational. It also provides the present invention to provide the pool operator with a visual status indicator of the safety valve status, clearly showing whether the safety valve either armed or tripped.

DETAILED DESCRIPTION

Figure 1:
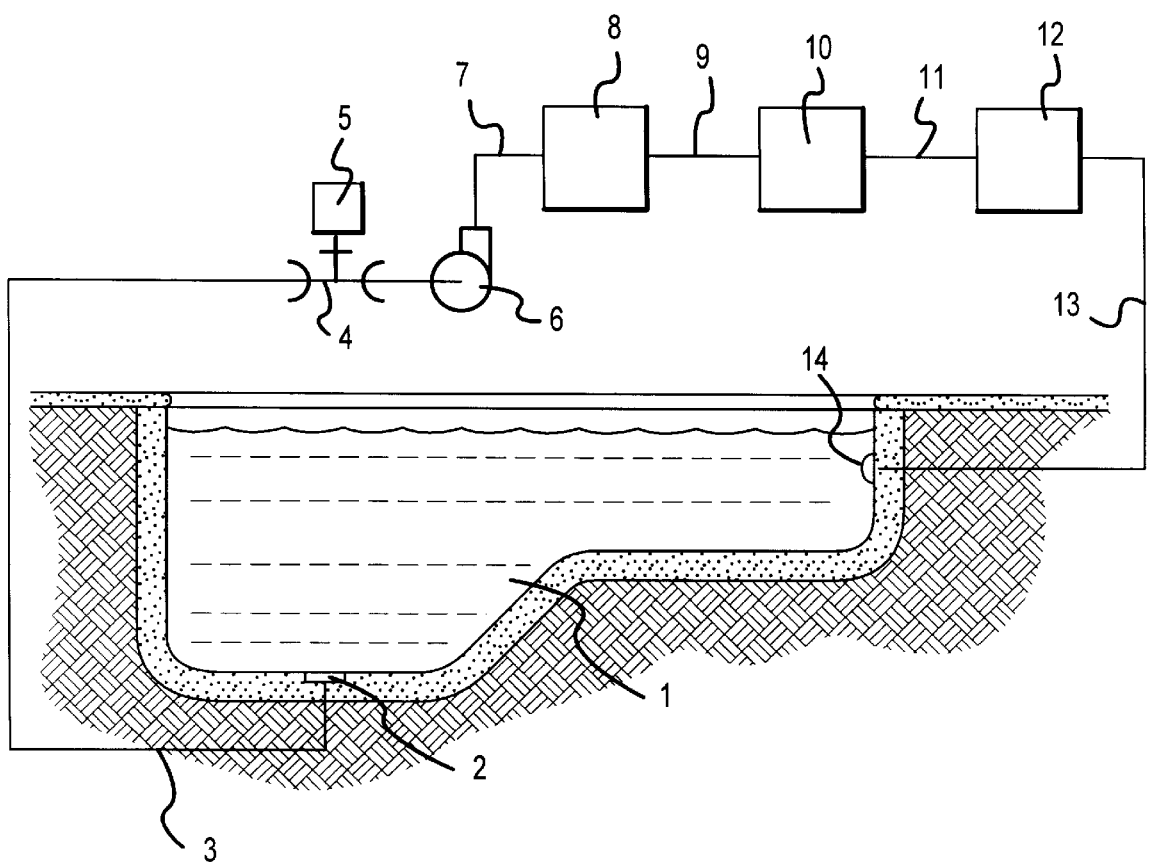
FIG. 1 is a schematic diagram of a swimming pool and its water circulation system utilizing a flow blockage suction interrupt valve of the present invention.
Figure 2:
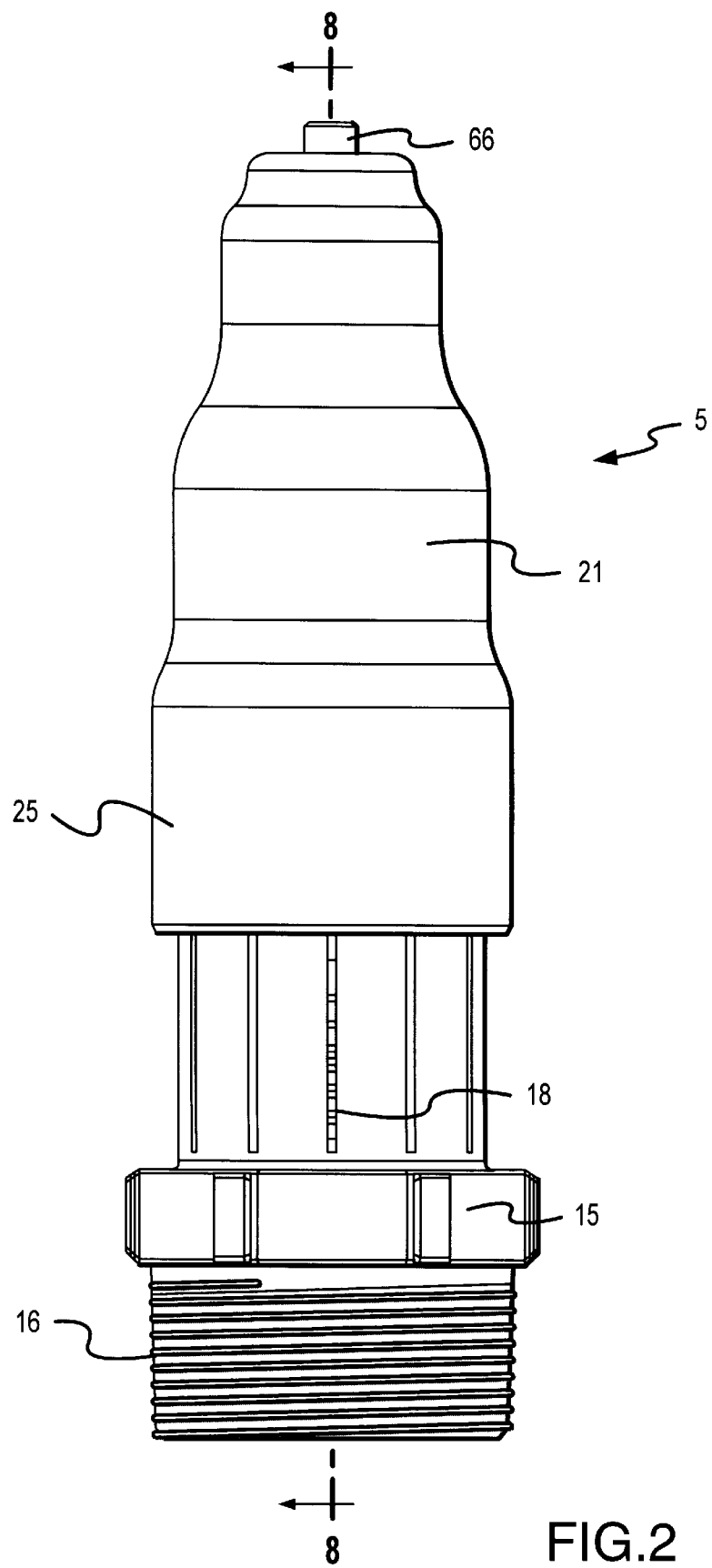
FIG. 2 is a side elevation view of the flow blockage suction interrupt valve of the present invention.

Modern swimming pools, hydrotherapy pools, and wading pools include a water circulation system for the purpose of maintaining the water quality with sanitization, filtration, and heating. A swimming pool circulation system incorporating a prepaid embodiment of a flow blockage suction interrupt valve 5 of the present invention is shown in FIG. 1. Circulation of water through the water quality maintenance equipment of a typical swimming pool 1 is provided by the flowpath created by the interconnecting circulation piping system 2, 3, 7, 9, 11, 13, 14 and the flow within created by a circulation pump 6. Water is supplied to circulation pump 6 by outlet fitting 2 and delivered to the circulation pump through suction inlet pipe 3. Water is then delivered to a sanitizer 8 through the pump discharge pipe 7, to a filter 10 through the filter influent pipe 9, and then to a heater 12 through filter effluent pipe 11. The sanitized, filtered, and heated water is then returned to the swimming pool through pool return pipe 13 and is distributed to the swimming pool interior by return inlet fitting 14. The present invention addresses the problem associated with suction entrapment of a bather's body should the bather inadvertently block the flow of water flowing affluently from the swimming pool 1 at outlet fitting 2. Most preferably, flow blockage suction interrupt valve 5 installed into a plumbing tee 4 on suction inlet pipe 3 upstream of the circulation pump 6 and installed physically above the water level of swimming pool 1. Now referring to FIG. 2, valve body 15 includes 2" male pipe thread 16 on its lower end, as a removable attachment means to connect the invention into the outlet of a threaded plumbing tee. Obviously other attachment means could be used and still fall within the scope of the invention.

The purpose of valve 5 is to instantly introduce atmosphere into suction inlet pipe 3 in the event a dangerous level of vacuum is created within that pipe. Valve 5 includes a plurality of air intake slots 18 perforating valve body 15. Air intake slots 18 provide the flowpath for air to flow into the valve body 15 when valve 5 is actuated. Also, the narrow width of slots 18, preferably 0.050" wide, prevents unwanted debris and pests from getting inside the valve.

Figure 3:
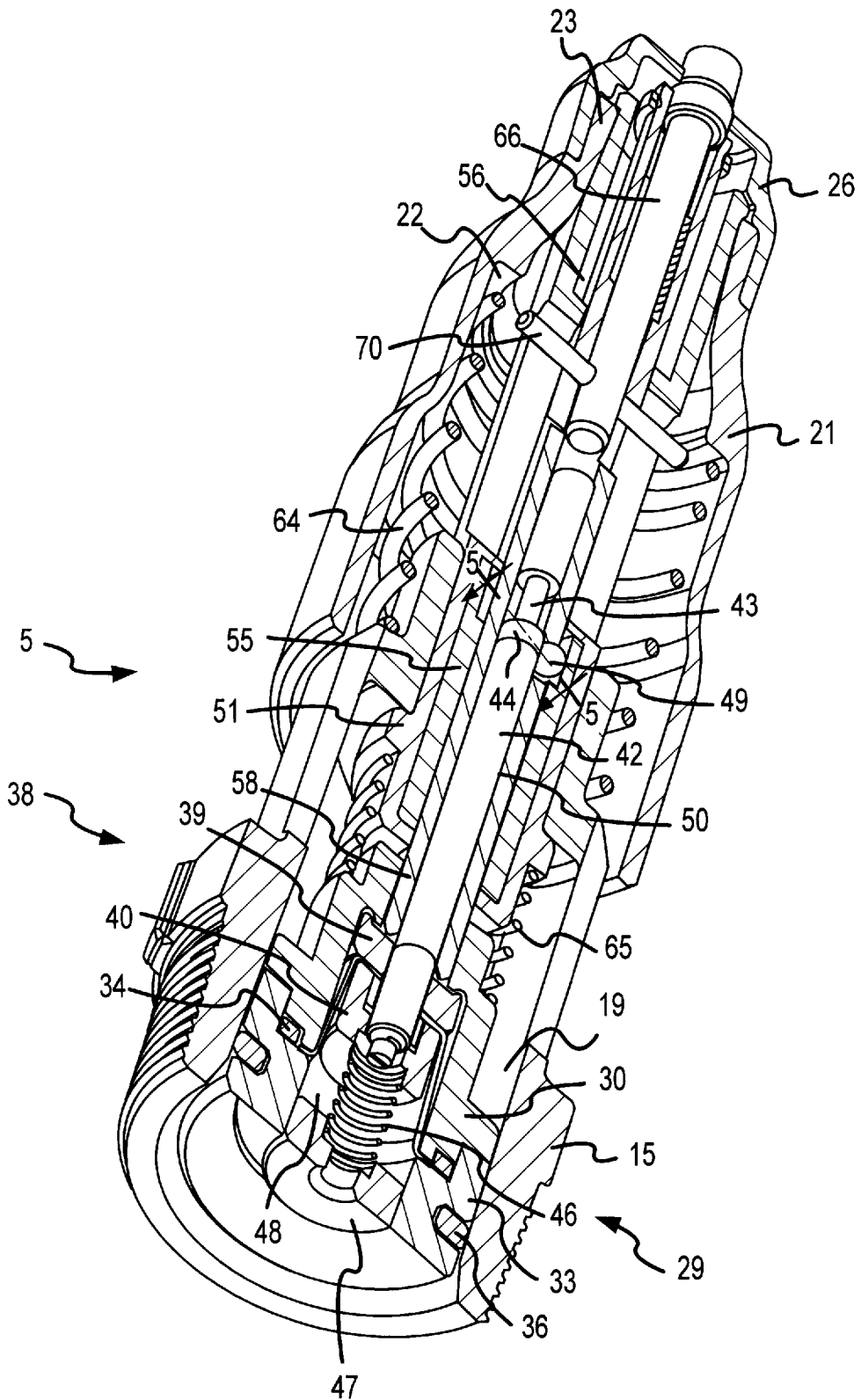
FIG. 3 is a perspective fragmented view of the flow blockage suction interrupt valve shown in FIG. 2, in an "armed" configuration.

Referring now to FIG. 3, it can be seen that in an "armed" configuration, incorporates a dynamic main valve piston 29 which is axially alligned with a valve bore 19. Comparing this confirguration to the "tripped" configuration shown in FIG. 7, it can be seen that main valve piston 29 can move out of valve bore 19 so as to open the flowpath for atmosphere to enter the piping interior and neutralize the high level of vacuum should valve 5 be actuated.

Valve 5 includes a telescopic actuator shaft assembly 50 composed of an upper actuator shaft 51, a lower actuator shaft 58, an open spring 65, and a close spring 64. Upper actuator shaft 51 and lower actuator shaft 58 are positioned through the center open spring 65, capturing open spring 65 between them. Open spring 65, a compression type spring, acts upon the upper actuator shaft 51 by pushing upwards against the shoulder 52 and, at its opposite end, the open spring 65 acts upon the lower actuator shaft 58 by pushing downwards against shoulder 32 of main valve piston 29 which is permanently attached to lower actuator shaft 58 at an actuator shaft aperature 31 on an upper piston half 39. The normal force of open spring 65 is biased to extend the length of the telescopic acutator shaft assembly 50 to the long configuration shown in FIG. 7 when the valve is in the open or "tripped" configuration.

Referring once again to FIG. 3, (the "armed" configuration), telescopic actuator shaft assembly 50 is positioned in a short configuration thus locating main valve piston 29 within valve bore 19. A water tight "bubble tight" seal is achieved between main valve piston 29 and valve bore 19 with their mutual contact of main valve elastomeric seal 36. Main valve elastomeric seal 36 resides in the main valve seal gland 35 on the periphery of a main valve piston 29.

Another compression type spring, close spring 64, creates a divergent force between an inner shoulder 22 of a reset button 21 and a top of the valve body 15, thus biasing reset button 21 to the top of its vertical stroke. Because the reset button 21 is permanently attached at its actuator aperature 23 to upper actuator shaft 51, and because the telescopic shaft assembly 50 is locked in the short ("armed") configuration, force of close spring 64 effectively positions main valve piston 29 within valve bore 19 so the valve is closed to the atmosphere in the "armed" configuration, with valves set for normal swimming pool circulation system operation.

Figure 4:
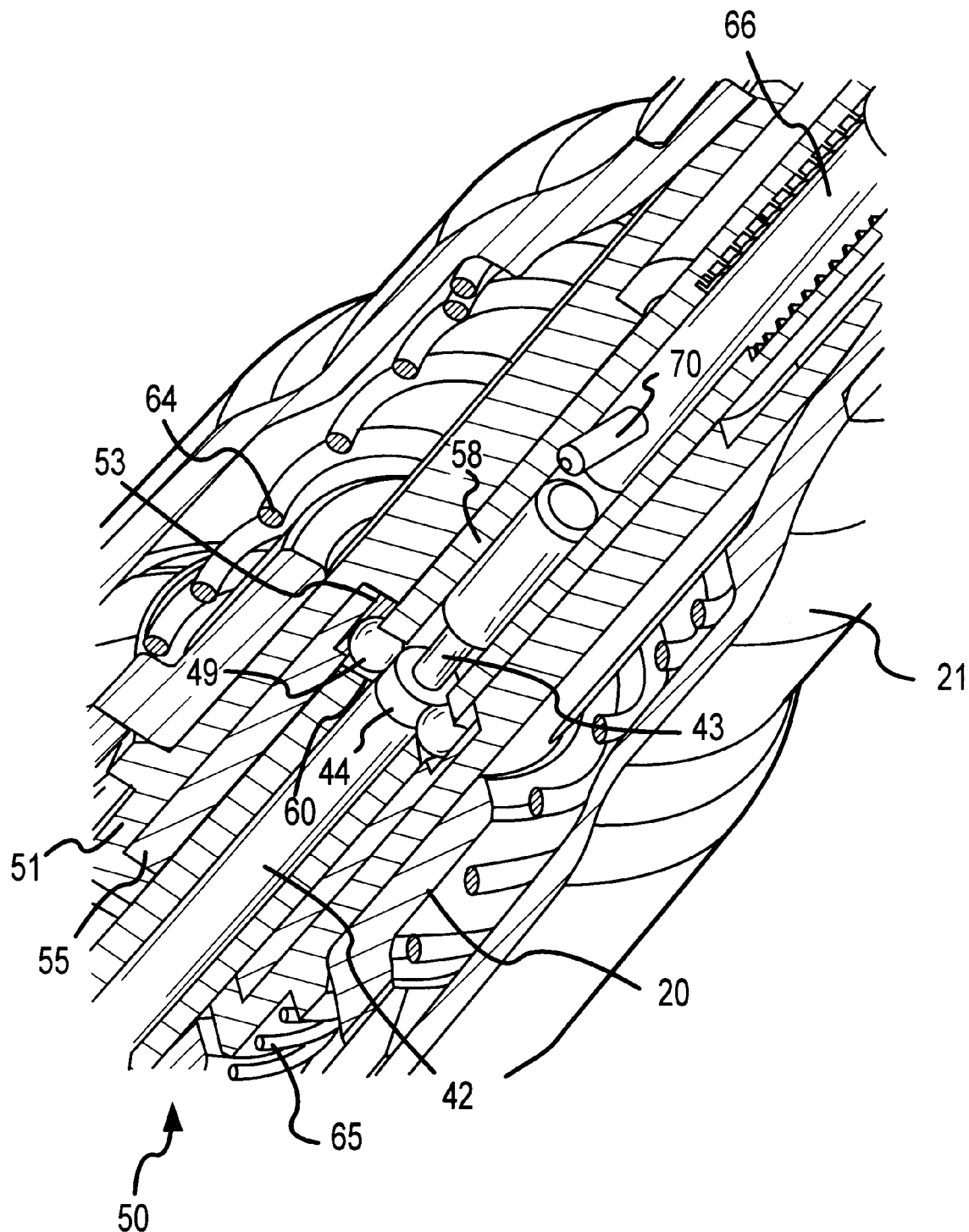
FIG. 4 is an enlarged fragmented section of the flow blockage suction interrupt valve shown in FIG. 3.

Illustrated in FIG. 4, is an upper trigger assembly in the "armed" configuration. Telescopic actuator shaft assembly 50 is held in the short configuration by the three ball locks 49. These small ball locks 49, which are preferably ⅛" diameter ceramic balls, reside in the three ball lock carrier holes 60 located in lower actuator shaft 58 which are equidistantly spaced radially 120° apart. The ball locks 49 also protrude into a raceway 53, which is a groove cut or formed into the interior of upper actuator shaft 51 and act to lock the upper actuator shaft 51 to lower actuator shaft 58 in the short configuration. Trigger shaft 42 alone holds ball locks 49 in this locking position and independently locks telescopic shaft assembly 50 in the short configuration so that it cannot extend into the long configuration to open the valve to atmosphere.

In the "armed" configuration when telescopic actuator shaft assembly 50 is in the short configuration, open spring 65 is compressed and in a pre-loaded state of readiness to instantly open valve 5 to atmosphere by extending telescopic actuator shaft assembly 50 to the long configuration. Ball locks 49 hold open spring 65 in check until ball locks 49 are allowed to move radially inward by the downward movement of trigger shaft 42. The trigger point occurs when recess 43 of trigger shaft 42 alligns with ball lock carrier holes 60 in lower actuator shaft 58.

Figure 5:
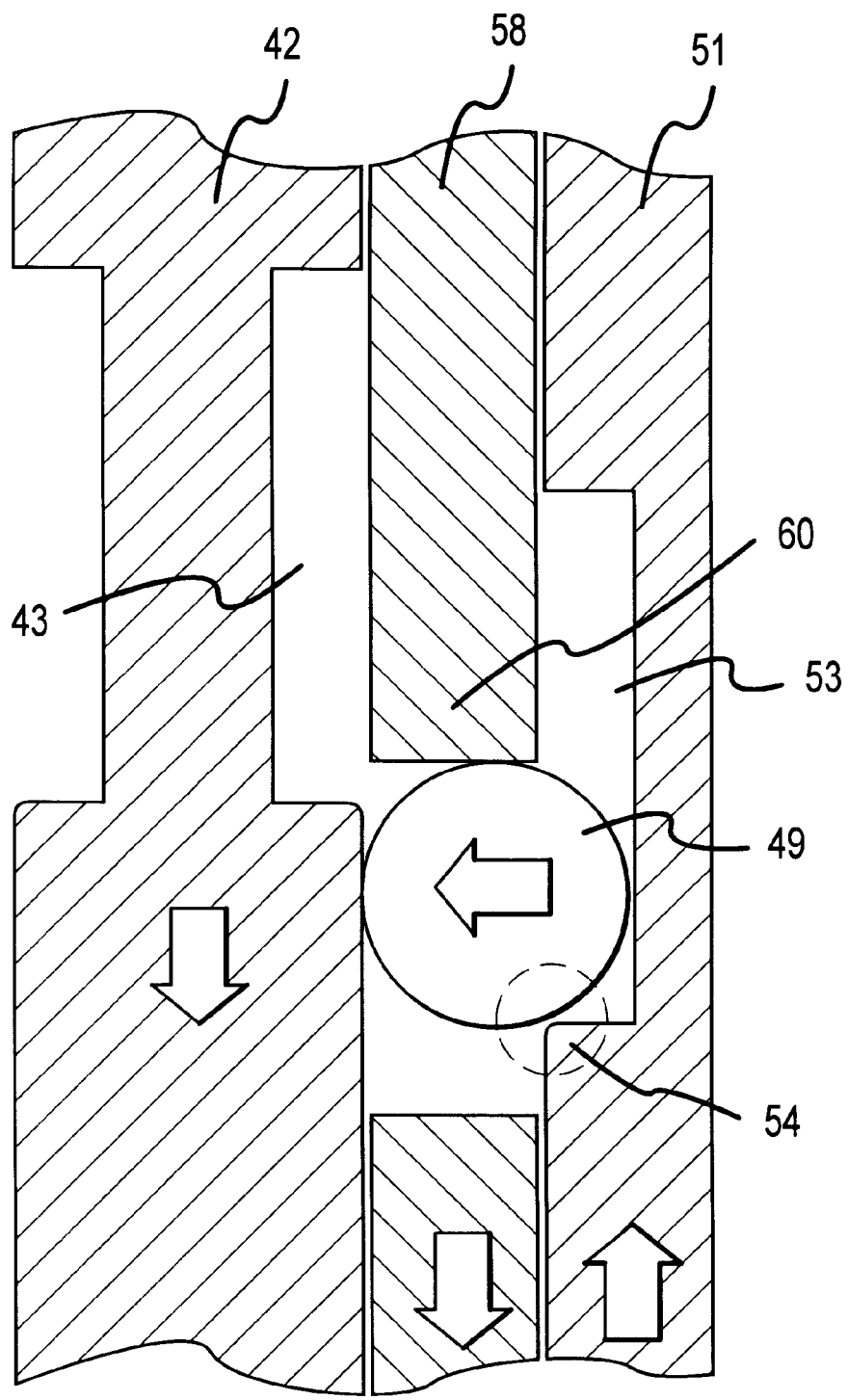
FIG. 5 is a sectional view of the flow blockage suction interrupt valve of the present invention, taken along lines 5—5 of FIG. 3.

Referring now to FIG. 5, it can be seen that there is a relationship of force exerted between main trigger components. Lower actuator shaft 58 is locked to upper actuator shaft 51 by three ball locks 49. The force of open spring 65 provides a shear force between upper actuator shaft 51 and lower actuator shaft 58. This shear force is kept in check while ball locks 49 reside partially inside raceway 53 formed into the interior of upper actuator shaft 51.

When trigger shaft 42 is pulled downward by a high vacuum level within the circulation piping, ball locks 49 are allowed to move inward radially into recess 43 in trigger shaft 42. Ball locks 47 are forced radially inward by leading edge 54 of raceway 53. This happens because leading edge 54 is being forced upwards in relation to lower actuator shaft 58. by the open spring 65 (see FIG. 3) Ball locks 49 are in contact with the tops of ball carrier holes 60 of lower actuator shaft 58. Because of the angle of contact between ball locks 49 and leading edge 54 of raceway 53, they can only move radially inward. At precise moment ball locks 49 vertically clear leading edge 54 of raceway 53, lower actuator shaft 58 is no longer locked to upper actuator shaft 58, allowing open spring 65 to instantly open valve by telescoping lower actuator shaft 58 divergently away from upper actuator shaft 51. Valve 5 is now open to atmosphere allowing air to enter the piping.

In the preferred embodiment, vital parts of the trigger mechanism of valve 5 are produced from ceramics so not to corrode or fuse together by micro-welding or galling as is common with metal parts. Ceramics are preferably used to manufacture ball locks 49, ceramic insert 55 molded into the interior of upper actuator shaft 51, and ceramic sleeve 44 positioned at the lower edge of recess 43 of trigger shaft 42.

Trigger assembly 37 is illustrated in FIG. 3. Assembly 37 includes a trigger piston 38 which is housed inside main valve piston 29 a trigger shaft 42 which can slide up and down inside the lower actuator shaft 58, three ball locks 49, a diaphragm 48, a trigger spring 46 and trigger spring retainer 47. The bottom of trigger piston 38 is in fluid communication with the interior of the piping. Trigger piston 38 is attached to the piping by a hole in the center of trigger spring retainer 47. Trigger piston 38 and attached trigger shaft 42 are spring-loaded upwards by trigger spring 46 and held fast against the bottom end of lower actuator shaft 58.

Trigger piston 38 is sealed to the valve interior by the diaphragm 48. Diaphragm 48 is preferably made of an elastomeric material, and provides for the vertical linear movement of trigger piston 38 and attached trigger shaft 42. The thimble-shaped diaphragm 48 is sandwiched between upper trigger piston half 39 and lower trigger half 40 at its upper narrow end, and outer rim of diaphragm 48 is sandwiched and retained within a diaphragm gland 34 that is formed between upper piston half 30 and lower piston half 33 of main valve piston 29.

In normal operation, when the swimming pool circulation system is operating at safe vacuum levels, trigger piston 38 and trigger shaft 42 remain stationary because normal vacuum levels cannot overcome the upwards force exerted on trigger piston 38 by trigger spring 46 holding trigger piston 38 stationary against the bottom end of lower actuator shaft 58.

Figure 6:
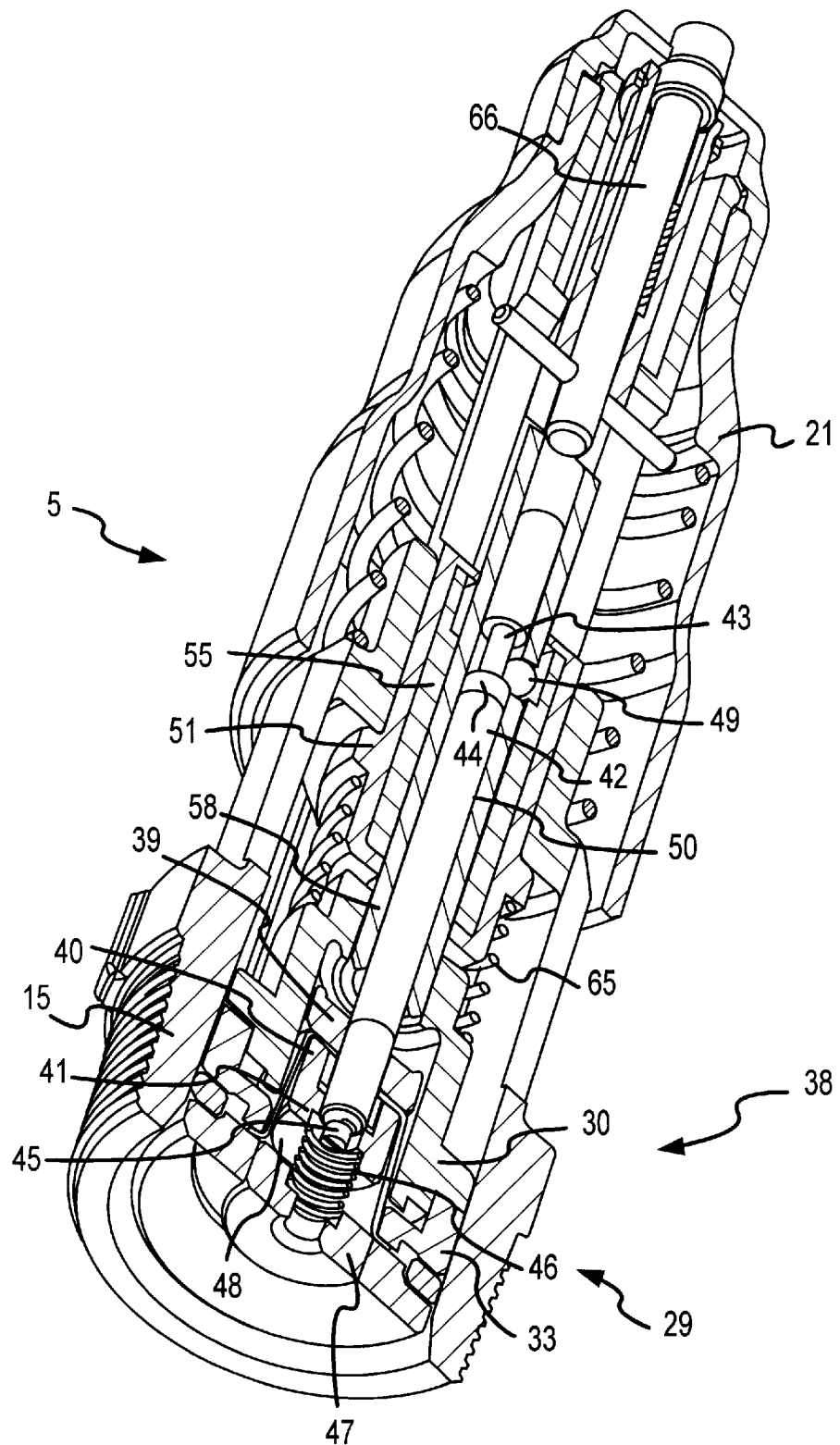
FIG. 6 is a perspective fragmented view of the flow blockage suction interrupt valve shown in FIG. 2, in a "triggered" configuration.

Referring now to FIG. 6, valve 5 is shown in the "triggered" configuration. This configuration arises when the vacuum level within the circulation piping exceeds the safe and normal limit, approximately 10" Hg, at that point, the increase in vacuum begins to pull trigger piston 38 and trigger shaft 42 downward by overcoming the upward force exerted on trigger piston 38 by trigger spring 46. When the vacuum level reaches a predetermined dangerous level, preferably 14" Hg, trigger shaft 42 has moved downward to the trigger point, ball locks 49 roll radially inward into recess 43 in trigger shaft 42, and valve 5 actuates by enabling open spring 65 to extend telescopic actuator shaft assembly 50 to the long configuration.

The preload of trigger spring 46 is adjustable by a threaded engagement between trigger spring retainer 47 and main valve piston 29. This adjustment can be made permanent with an adhesive or welding during of manufacture. Preferably t he trigger point of valve 5 is calibratable. Calibration is achieved through is a threaded engagement between trigger shaft 42 and trigger piston 38. Calibration is accomplished by adjusting the distance between the top of trigger piston 38 and the top of ceramic sleeve 44 by inserting a screwdriver through the hole in trigger spring retainer 47 and turning the screw head adjustment 45 of trigger shaft 42. This adjustment can be made permanent at the point of manufacture by filling potting well 41 of trigger piston 38 with a potting compound that encases screw head adjustment 45 of trigger shaft 42.

Figure 7:
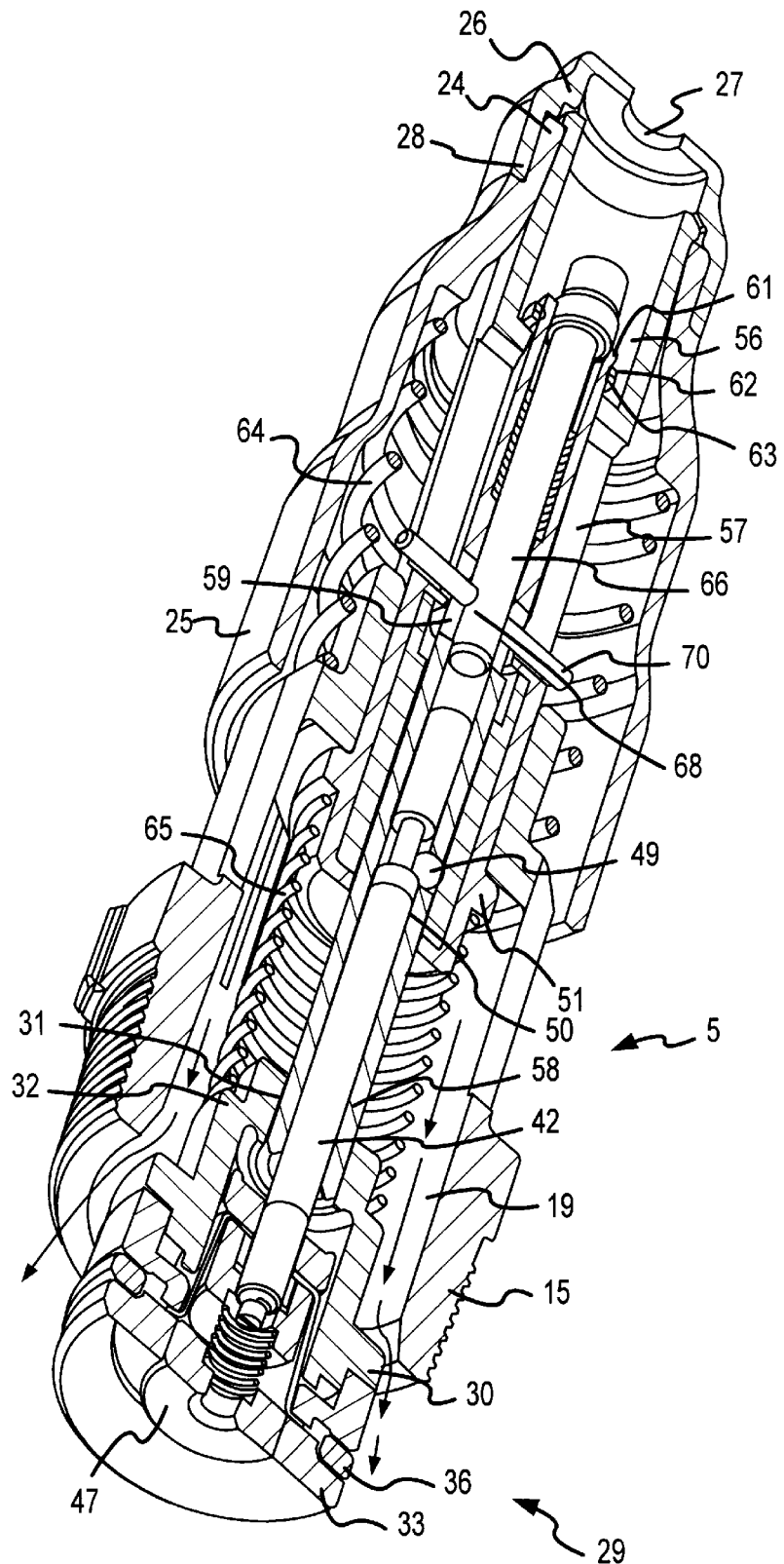
FIG. 7 is a perspective fragmented view of the flow blockage suction interrupt valve shown in FIG. 2, in a "tripped" configuration.

When valve 5 actuates and main valve piston 29 shoots downward into the pipe to which it is attached, valves must have a means to limit the travel of piston 29. Referring now to FIG. 7, it can be seen that upper actuator shaft 51 has the largest diameter, and houses lower actuator shaft 58 within it. The top of upper actuator shaft 51 includes a counterbore 56. The top of lower actuator shaft 58 has a snap ring 62 installed in snap ring groove 61 in lower actuator shaft 58 and an O'ring 63 installed immediately below snap ring 62 on lower actuator shaft 58. Snap ring 62 limits the opening stroke of valve 5 when it comes in contact with the bottom of counterbore 56. O'ring 63 serves as a shock absorber to prevent damage to valve 5 from the shock of the spring-powered actuation.

Figure 8:
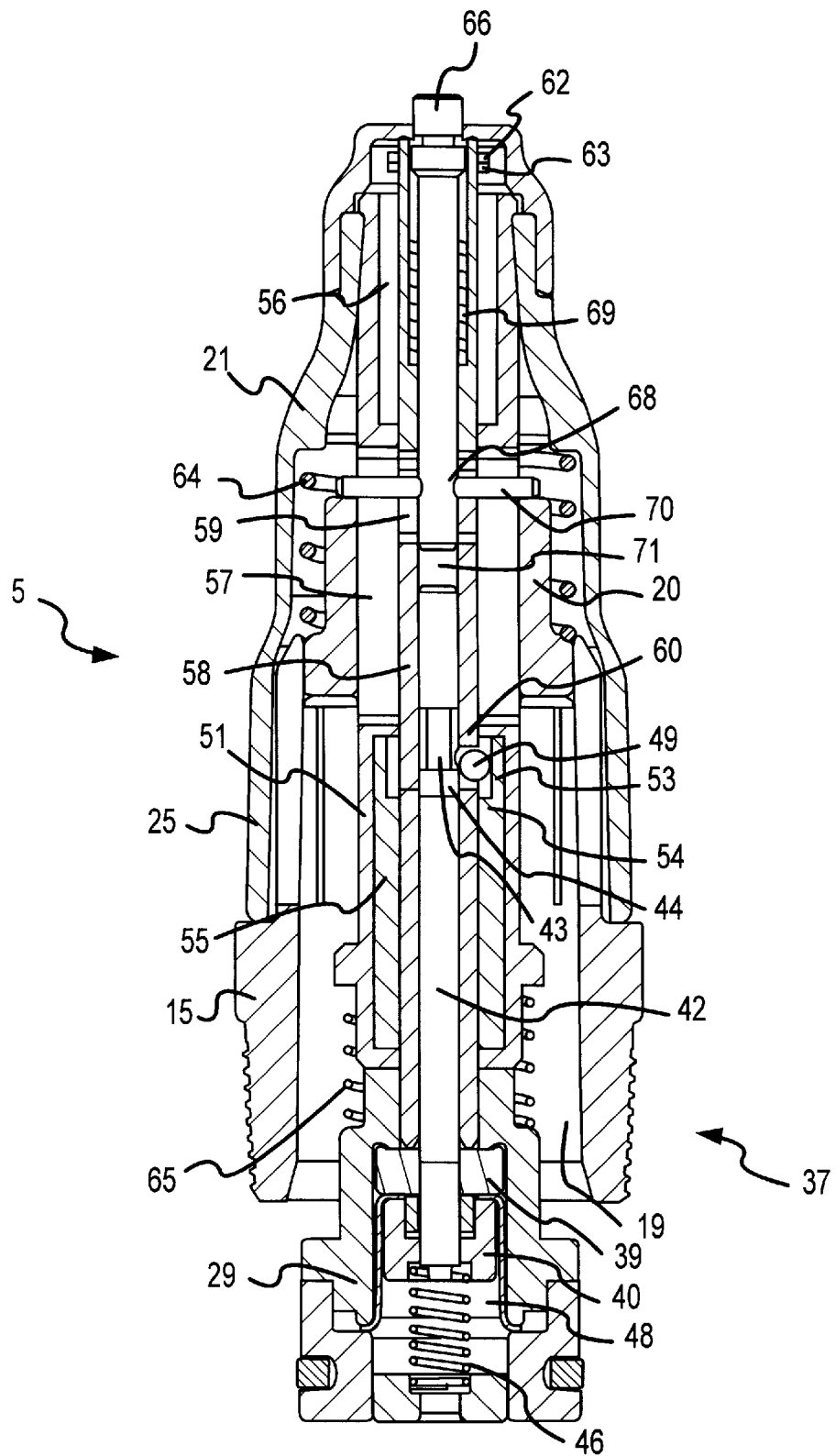
FIG. 8 a section view of the flow blockage suction interrupt valve of the present invention, taken along liens 8—8 of FIG. 1, in a "reset" configuration.

Once this valve has actuated, it must be manually reset, in a manner analogous to the operation of an electrical circuit breaker. Referring now to FIG. 8 "reset" configuration. In this illustration, the reset button 21 has been pushed down so as to contact valve body 15 with a reset button skirt 25. Stop pin 70 is installed in test button 66 through a stop pin aperature 68. Test button 66 and stop pin 70 are spring-loaded upwards by return spring 69. Stop pin 70 extends through stop pin slots 59 in lower actuator shaft 58, and through stop pin slots 57 in upper actuator shaft 51. In this illustrated "reset" configuration, stop pin 70 is now providing the limiting means to hold lower actuator shaft 58 from moving downward past the end of its desired stroke. This is accomplished by the top of stop pin slots 59 in lower actuator shaft 58 coming in contact with stop pin 70, and stop pin 70 in turn contacting the top of valve body neck 20. Pushing reset button 21 downward only moves upper actuator shaft 51. This allows the mechanism to reset to the "armed" configuration because the reset motion pushes leading edge 54 of raceway 53 below the bottom of the ball lock carrier holes 60. By this described process, both open spring 65 and close spring 64 are manually compressed by the reset motion, taking their force off trigger assembly 37. Ball locks 49 are now biased to move into their original "armed" position in raceway 53 by the remaining upwards force exerted on them by the trigger spring 46 pushing upwards on trigger shaft 42 and forcing ball locks 49 out of recess 43 in trigger shaft 42 and back into raceway 53 in upper actuator shaft 51.

Telescopic actuator shaft assembly 50 is now locked in the short configuration, and close spring 64 is the dominant force acting on telescopic actuator shaft assembly 50. As reset button 21 is released, close spring 64 pushes telescopic actuator assembly 50 upwards, and, in the process, main valve piston 29 is repositioned within the valve bore 19.

Figure 9:
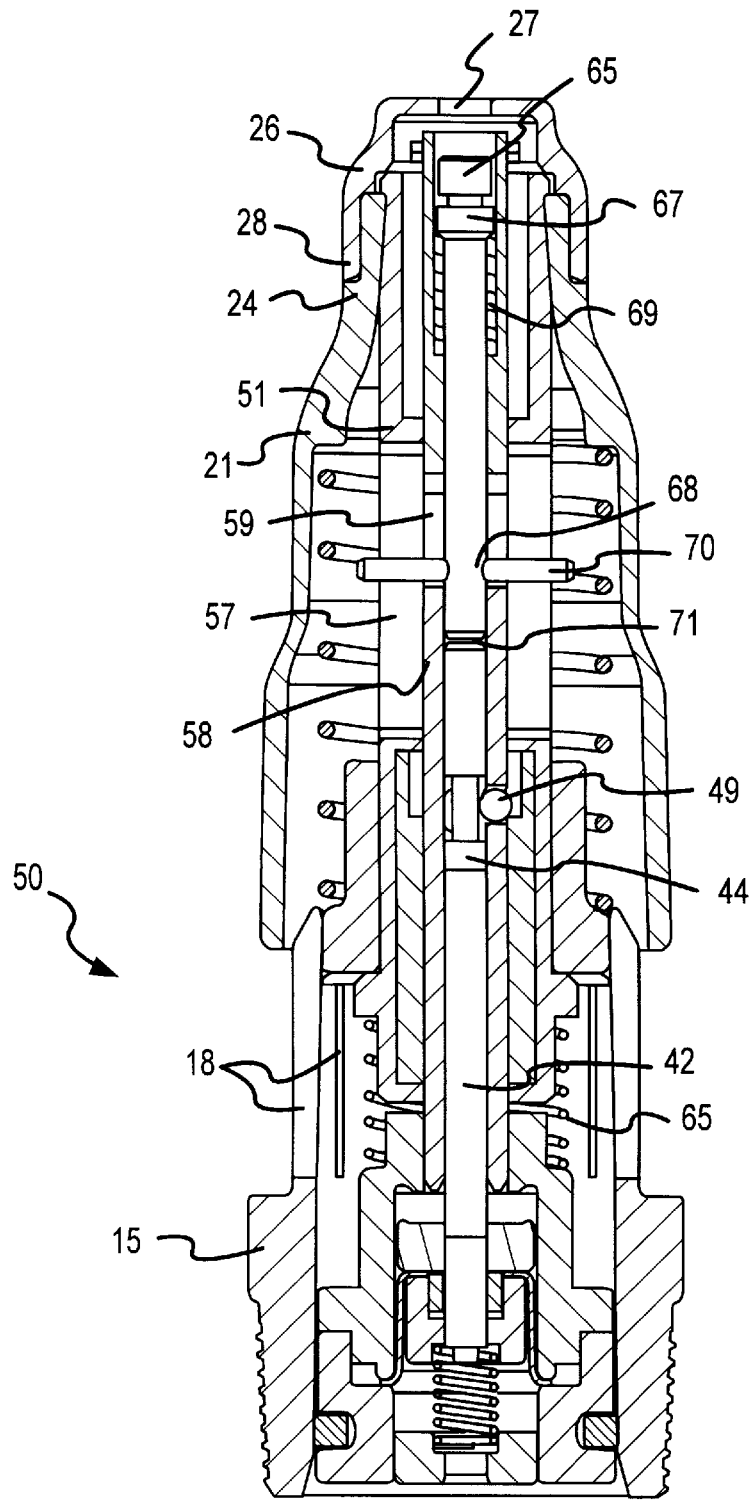
FIG. 9 is a section view of the flow blockage suction interrupt valve of the present invention, taken along liens 8—8 of FIG. 1, in a "test" configuration.

Turning now to FIG. 9, it can be seen that upper side of the reset button 21 incorporates an attachment nipple 24 that receives attachment socket 28 of a permanently installed closure cap 26. Closure cap 26 has a test button aperature 27 to allow protuberance of test button 66. Test button 66 is spring-loaded upwards by return spring 69, which is a compression spring. Return spring 69 is positioned on the bottom of counterbore 56 in upper actuator shaft 51 and pushes upwards on shoulder 67 of test button 66.

During the assembly of this valve, test button 66 is secured in position by installing stop pin 70 through stop pin slots 57 in upper actuator shaft 51 and through stop pin slots 59 in lower actuator shaft 58 and through stop pin aperature 68 in test button 66. The upward movement of test button 66 is limited by the contact between stop pin 70 and stop pin slots 59 located in the wall of lower actuator shaft 58. Stop pin 70 slides easily within the stop pin slots 57 and 59, but fits tightly in stop pin aperature 68 so as to remain permanently installed.

Valve 5 can be tested by the operator to verify it is operational. Test button 66 is depressed so as to contact the top of trigger shaft 42 and force trigger shaft 42 past its trigger point, actuating valve 5. The trigger point is the point the top edge of ceramic sleeve 44 on trigger shaft 42 is below the horizontal center of ball locks 49. There is an air gap 71 between the bottom of test button 66 and the top or trigger shaft 42. Air gap 71 eliminates any interference of test button 66 with the normal operation of trigger shaft 42. Air gap 71 also increases the vertical stroke of test button 66 necessary to touch the top of trigger shaft 42. The benefit here is that, because of the long stroke of test button 66 that takes it below the top of closure cap 26, a screwdriver is required to test the valve. This effectively discourages unwanted test actuations by mischievous persons.

Additionally, valve 5 includes a visual indicator as to whether the valve status is "armed" or "tripped". This is accomplished by test button 66, preferably produced in a bright color contrasting the color of reset button 21. Comparing FIG. 3, the "armed" configuration, FIG. 7, the "tripped" configuration, it can be seen that test button 66 is only visable at the top of reset button 21 when the valve is in the "armed" configuration.

Preferably the majority of the rigid parts of valve 5, including body 15, reset button 21, closure cap 26, main valve piston 29, and upper actuator shaft 51, should be manufactured from weatherproof thermoplastic. Black polypropylene is preferred. Trigger parts ball locks 49, ceramic sleeve 44, and ceramic insert 55, are preferably ceramic. Springs 46, 64, 65, and 69, lower actuator shaft 58, test button 66, snap ring 62, stop pin 70, trigger piston 38, and shaft 42, ae preferably stainless steel. Diaphragm 48, main valve elastomeric seal 36, and O'ring 63 are preferably produced from chemical resistant EPDM synthetic rubber. In the most preferred embodiment, test button 66 is coated with bright yellow nylon or epoxy to create a contrasting color to the black polypropylene, thereby creating a clear visual indication of the valve status.

Presently preferred embodiments of the present invention and many of its improvements have been described with a degree of particularity. It should be understood that this description has been made by way of preferred examples, and that the invention is defined by the scope of the following claims.

What is claimed is:

1. A flow blockage suction interrupt valve adapted for attachment to and fluid communication with a suction piping system of a pool system, said valve comprising:
    a housing defining a flow path between atmosphere and said piping system;
    a dynamic plug means positioned in said housing for opening and closing said flow path;
    a spring-loaded first actuator means attached to said dynamic plug means and operative to place said valve in an armed state or a tripped state, wherein in the armed state, said dynamic plug means closes said flow path, preventing atmospheric air from reaching said suction piping system through said valve and allowing normal pool system operation;
    a spring-loaded second actuator means normally not acting on said plug means adapted to reposition said plug means and open said flow path to relieve excessive suction in said piping system and;
    a triggering means activated by a predetermined vacuum level, operatively connected to second actuator means, wherein when said predetermined vacuum level activates said triggering means, said second actuator means acts on said plug means, predominating said first actuator means, opening said flow path, allowing atmosphere to enter said piping system, and placing said valve in said tripped state.

2. The valve according to claim 1 wherein said housing is non-serviceable tamper-proof valve.

3. The valve according to claim 2 wherein the first and second actuator means and the triggering means are isolated from the flow stream of the suction piping so as to protect their integrity.

4. The valve according to claim 3 further comprising:
    air intake slots sized small enough to keep insects and debris out of the valve.

5. The valve according to claim 1 wherein said plug means is a disc positioned within a cylindrical flow path and said disc is rotatably mounted on an axis perpindicular to the cylinder axis.

6. The valve according to claim 1 wherein said plug means includes a piston that moves axially in and out of a cylinder.

7. The valve according to claim 6 wherein said piston is attached to a telescopic actuator shaft.

8. The valve according to claim 7 wherein said telescopic actuator shaft is spring-loaded to extend.

9. The valve according to claim 6 wherein said triggering means includes a diaphragm-actuated piston.

10. The valve according to claim 9 wherein said diaphragm actuated piston is spring-loaded to resist the force of a vacuum.

11. The valve according to claim 10 wherein said triggering means locks said telescopic shaft in a closed position with dynamic balls.

12. The valve according to claim 11, wherein a least portions of the triggering means are ceramics material.

13. The valve according to claim 6 further including a manual reset comprising a push button attached to the telescopic shaft.

14. The valve according to claim 13 wherein a part of the telescopic shaft is not attached to the reset button and has a travel limiting means.

15. The valve according to claim 9 further including a manual test button that manipulates the trigger mechanism.

16. The valve according to claim 15 wherein said test button provides a visual indication of the valve plug position indicative of the valve being open or closed.

17. The valve according to claim 10, wherein a length of the trigger shaft is adjustable so as to calibrate the trigger setpoint of the safety valve.

18. The valve according to claim 17 wherein trigger setpoint adjustment can be permanently locked at the point of manufacture for the life of the safety valve.

19. The valve according to claim 10 wherein a pre-load of the trigger piston spring is adjustable so as to adjust the setpoint of vacuum level that the trigger first becomes dynamic.

* * * * *